Feb. 22, 1949.   A. D. McLENDON   2,462,656
CURB LINE INDICATOR FOR AUTOMOBILES
Filed Feb. 20, 1948
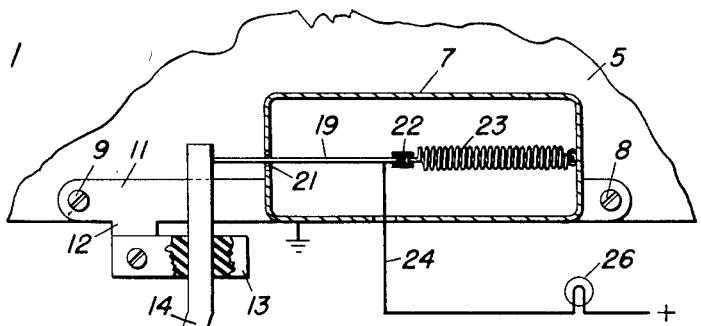
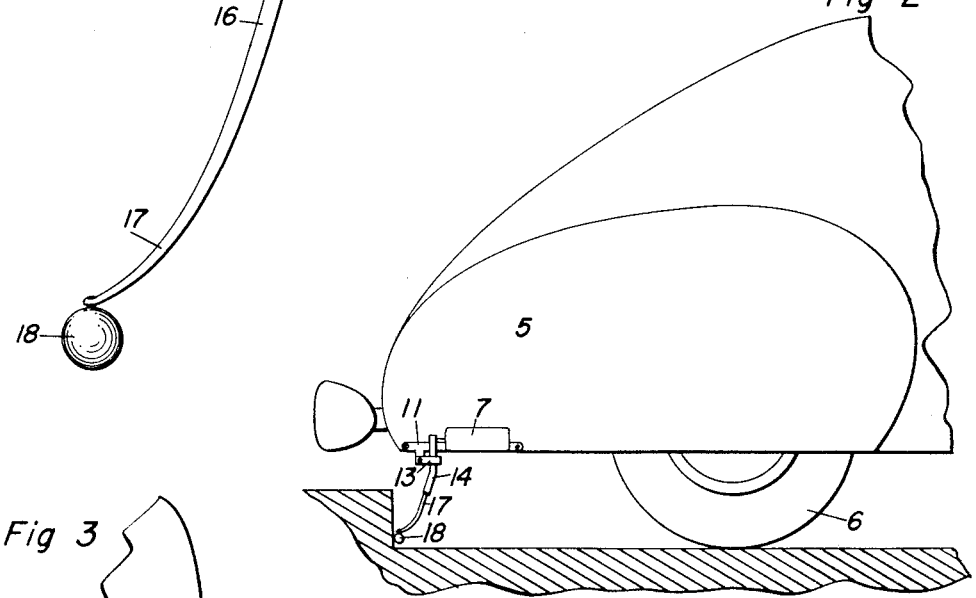
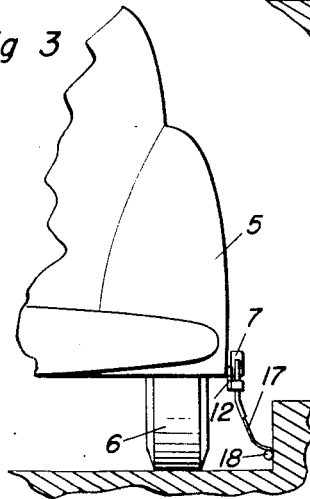
INVENTOR.
Alphonso D. McLendon
BY
Att'y Patented Feb. 22, 1949

2,462,656

UNITED STATES PATENT OFFICE 2,462,656

CURB LINE INDICATOR FOR AUTOMOBILES

Alphonso D. McLendon, Palo Alto, Calif.

Application February 20, 1948, Serial No. 9,674

1 Claim. (Cl. 200—52)

This invention relates to improvements in indicators and has particular reference to means for indicating the approach of a motor vehicle to the curb line, so as to prevent injury in contacting the curb.

A further object is to produce a device which may be readily attached to the fender of a motor vehicle, a device which will be neat in appearance, one which is sensitive, and a device which will not become easily deranged through its engagement with the curb.

A further object is to produce a device which is economical to manufacture, easy to install and one which is adjustable for various types of cars.

Other objects and advantages will be apparent during the course of the following description.

In the accompanying drawings forming a part of this specification and in which like numerals are employed to designate like parts throughout the same, Fig. 1 is a side elevation of my device as the same would be applied to the fender of a motor vehicle, portions thereof being shown in cross section;

Fig. 2 is a fragmentary side elevation of the rear portion of a motor vehicle showing my device engaging a curb, as in backing against the curb;

Fig. 3 is a fragmentary rear elevation of a motor vehicle showing my device engaging the curb when parking parallel thereto; and Fig. 4 is a fragmentary top-plan view of a motor vehicle showing my device engaging the curb.

In parking a car it is often exceedingly difficult to determine just how far a person can back before hitting the curb, or just how close the side of the vehicle may be to the curb.

Applicant has, therefore, devised a simple arrangement which may be attached to the rear fender which device will extend downwardly and slightly outwardly, so as to contact the curb previous to the tire engaging the same.

When the device engages the curb a signal light will be illuminated in the driver's compartment, thus warning the driver of the fact that further backing should cease.

In the accompanying drawings, wherein for the purpose of illustration is shown a preferred embodiment of my invention, the numeral 5 designates the rear right fender of a motor vehicle, and the numeral 6 the right rear wheel of the vehicle.

My device consists of a housing 7, which may be attached to the fender of a motor vehicle in any desired manner. In this particular instance, I have shown brackets 8 and 9.

Extending downwardly from the arm 11, is a bracket 12, to which is secured a supporting member 13, which, in the present instance, is illustrated as a rubber block, but it is to be understood that any flexible support may be secured to the bracket 12, so as to support the upper end 14, of a lever which has an extension 16, extending downwardly and outwardly to provide a curved portion 17, adjacent its lower end, to which is pivoted a ball or roller 18.

The upper end of this lever 14, has a rod 19, secured thereto which rod extends through an opening 21, formed in the housing 7, and has its opposite end connected to an insulating member 22, which, in turn, engages one end of a coiled spring 23, the opposite end of which is connected to the housing 7.

The rod 19, is electrically connected through a wire 24, to a bulb 26, positioned in the driver's compartment of the vehicle. The opposite side of the bulb 26, is connected to the positive side of the car battery.

The result of this construction is that, when the device is attached to the vehicle, as shown in the figures, if the vehicle is backed against the curb, as shown in Fig. 2, then the ball 18, will engage the curb and push the lever forwardly with respect to the car.

This will flex the rubber supporting block 13, and pull upon the rod 19, and also cause the rod 19, to contact the edge of the opening 21, which will act to ground the rod 19, to the housing 7, which act will cause the bulb 26, to become illuminated, indicating to the driver of the vehicle that he should not back further.

When the device is engaged with the curb as shown in Figs. 3 and 4, the ball 18, will roll along the curb, thus preventing any injury to the lever system and the same flexing action of the block 13, but in a side-wise direction, will again cause the rod 19, to engage the housing and to cause an electric circuit to be established through the light 26.

It will thus be apparent that my device will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A curb approach indicator device comprising a supporting elongated housing for attachment to the fender of a vehicle, a bracket carried by said housing, a flexible support mounted on said bracket, an obstruction-engaging lever carried by said flexible support and having its upper end extending above said flexible support and into alignment with the end of said housing, a rod connecting the upper end of said lever to a spring positioned in said housing, said rod passing through an opening in said housing whereby, when said lever is engaged by an obstruction, said rod will be moved against the side of the opening in said housing to effect a signalling action.

ALPHONSO D. McLENDON.

REFERENCES CITED

The following references are of record in the file of this patent:

UNITED STATES PATENTS

| Number | Name | Date |
|---|---|---|
| 2,243,497 | Bougie | May 27, 1941 |
| 2,436,123 | Sines | Feb. 17, 1948 |
| 2,440,587 | Krall | Apr. 27, 1948 |